United States Patent

[11] 3,634,167

[72] Inventor: Erich Plontke, Riehen, Switzerland
[21] Appl. No.: 868,833
[22] Filed: Oct. 23, 1969
[45] Patented: Jan. 11, 1972
[73] Assignee: Rohren-Keller A.G., Basel, Switzerland
[32] Priority: Apr. 15, 1966
[33] Switzerland
[31] 5520/66
Continuation-in-part of application Ser. No. 628,639, Apr. 5, 1967, now abandoned. This application Oct. 23, 1969, Ser. No. 868,833

[54] METHOD OF FABRICATING WELDED BRANCHED PIPE CONNECTIONS FROM WELDABLE THERMOPLASTIC MATERIALS
11 Claims, 20 Drawing Figs.

[52] U.S. Cl. .................................................. 156/257, 156/158, 156/159, 156/293, 156/304, 156/580, 156/583
[51] Int. Cl. .................................................... B32b 31/00
[50] Field of Search ................................................. 156/158, 159, 293, 304, 503, 580, 583, 257; 285/155, 156; 29/158

[56] References Cited
UNITED STATES PATENTS
3,013,925  12/1961  Larsen .......................... 156/503 X Primary Examiner—Benjamin R. Padgett
Assistant Examiner—R. E. Schafer
Attorney—Werner W. Kleeman ABSTRACT: There is disclosed a method of fabricating welded branched pipe connections from weldable thermoplastic materials, such as polyethylene, which includes shaping the end of a branch pipe section to the curvature of a main pipe section, simultaneously heating the shaped end of such branch pipe section and an annular zone of the main pipe section to a welding temperature, pressing the heated shaped end into the heated annular zone of the main pipe section to weld the sections and applying pressure to the material of the sections on both the inner and outer sides of the intersection between the branch pipe section and the main pipe section, while precluding spreading of the sections in a direction perpendicular to the direction in which the sections are pressed together so as to deform the material of the heated annular zone of the main pipe section upwardly into the material of the branch pipe section to increase the area of welding contact. There is also disclosed a press tool for use in such method, which includes outer and inner sleeve means spaced to accommodate a branch pipe section and such sleeves having shaped pressure applying end portions, operative to deform the cross-sectional welding line of contact into a raised lip or hump to increase the area of welding contact.

PATENTED JAN 11 1972 3,634,167

ERICH PLONTKE,
INVENTOR

By: Jacobi, Davidson & Kleeman
ATTORNEYS.

Temperature and pressure diagramm for print B, Fig. 8

3,634,167

METHOD OF FABRICATING WELDED BRANCHED PIPE CONNECTIONS FROM WELDABLE THERMOPLASTIC MATERIALS

BACKGROUND OF THE INVENTION

The present invention relates broadly to the art of welding thermoplastic materials.

More particularly, this invention relates to a method of fabricating welded branched pipe connections from weldable thermoplastic materials and to a pressing tool for use in such method and this application is a continuation-in-part of my prior filed application Ser. No. 628,639 filed Apr. 5, 1967 and entitled METHODS OF WELDING THERMOPLASTIC MATERIAL, now abandoned.

Various techniques for welding by heat or by heat and pressure of thermoplastic materials are known in the art.

In the welding of members such as sheets and tubes of thermoplastic material by means of heated tool welding or press butt welding, it is common for portions of the members which are to be welded together to first be heated to the welding temperature and to then be pressed together until they have solidified. The welding temperatures for any material are well known to those skilled in the art as the temperature at which the material is plasticized. Thus, it is unneccessary to go into further detail for welding temperatures of individual materials herein. Ordinarily, the parts to be welded are pressed together under pressures on the order of 0.5 to 2 kg./cm$^2$. In some cases, pressures of up to about 5 kg./cm$^2$ have been employed, which has caused a reduction in the quality of the welds. The disadvantages of such welds are well known: the higher the pressure applied, the larger will be the weld beads formed, between which a harmful notch exists. Even if the beads are removed by subsequent machining so that a notch is no longer present on the outside, the quality of the weld is not substantially improved.

It is further known in the art to fabricate molded thermoplastic pipe fittings by a procedure which includes placing preforms in a mold with interposed fillets at the intersections of a main pipe section with a branched pipe section, heating the mold for a substantial period of time, evacuating the mold cavity and subjecting the preforms to pressure, see U.S. Pat. to J. N. Scott, Jr., No. 3,312,765 dated Apr. 4, 1967.

However, apart from complex equipment being necessary, this procedure is time consuming and is directed to the use of partly polymerized thermoplastics, i.e., particle formed polymer, which is completely polymerized in the mold.

SUMMARY OF THE INVENTION

Accordingly, it is an object of the present invention to provide a method of fabricating welded branched pipe connections from weldable thermoplastic materials that is economical to perform and ensures an improved weld joint in a minimum of time.

It is a particular object of this invention to provide such a method in which a branch pipe section is cut or milled to the curvature of a main pipe section, the shaped or cut end of the branch pipe section and an annular zone of the main pipe section are subjected to heat to the welding temperature, pressed together with the heated areas in contact to form a weld joint and pressure is applied to the sections at the welding zone while precluding spreading of the sections in a direction perpendicular to the direction in which the sections are pressed together.

Another object of the invention is to provide a press tool constructed and arranged for applying pressure to the sections and which includes inner and outer sleeve portions that accommodate the branch pipe section therebetween and which sleeve portions have free ends shaped to engage the main pipe section so that an application of pressure will cause the contact line between the end of the branch section and the main pipe section to be deformed from an initial straight line of contact into a raised lip or hump, thereby increasing the line of contact so as to increase the rigidity of the weld joint.

BRIEF DESCRIPTION OF THE DRAWINGS

Further and more specific objects and advantages will become more readily apparent from the following description when taken in connection with the accompanying drawings in which.

DETAILED DESCRIPTION OF THE PREFERRED EMBODIMENTS

The method of the invention consists generally in a technique for welding together weldable thermoplastic pipe portions to form a branched pipe connection in which the pipe portions to be welded are first heated to a welding temperature and then pressed together with backing or confining elements being positioned on each side of the said portions to prevent the thermoplastic material from spreading in a direction perpendicular to the direction in which the portions are pressed together. With this procedure, the portions are pressed together with a pressure of from about 10 to about 100 kg./cm$^2$.

Figure 1:
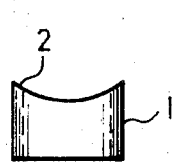
FIG. 1 illustrates a precut or milled branch pipe section.
Figure 2:
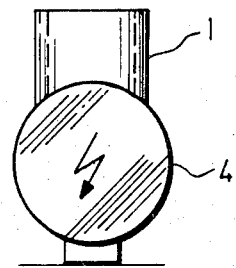
FIG. 2 diagrammatically illustrates the heating of the end of such branch pipe section that is to be welded.
Figure 3:
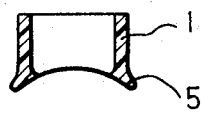
FIG. 3 is a vertical cross sectional view of such heated branch pipe section.
Figure 4:
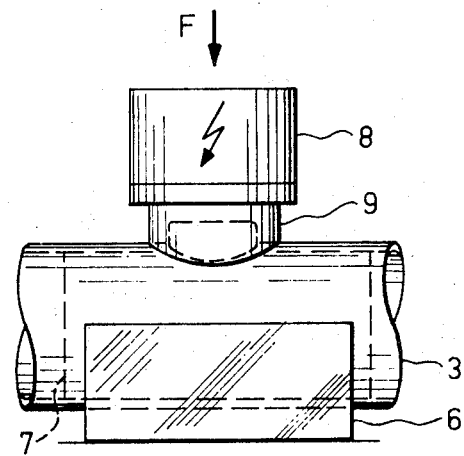
FIG. 4 is a diagrammatic view illustrating the heating of an annular zone of the main pipe section.
Figure 5:
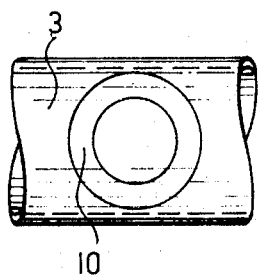
FIG. 5 is a top plan view illustrating the heated zone of the main pipe section.

Thus as illustrated in the drawings, a branch pipe section or portion 1 of thermoplastic material such as polyethylene is milled at its end 2 to conform to the outer surface of a main pipe section or portion 3 of the same material. Then this pipe portion 1 is placed with its end 2 against a heating cylinder 4, FIG. 2. This heating cylinder is of the same diameter as the outer diameter of pipe portion 3 and is heated to 200° C. The end 2 of pipe portion 1 is pressed against the cylinder 4 and is thus softened and spread to form what could be termed a bead 5 at its heated end. Simultaneously with the heating of the pipe portion 1 the main pipe portion 3 is heated. As shown in FIG. 4, the main pipe portion 3 is supported on a cradle 6 with a backing or counter pressure forming aluminum tube 7 inserted therein. This tube 7 prevents collapse of pipe portion 3 during application of heat thereto and during the subsequent application of pressure. A heating means 8 having a lower end 9 corresponding in shape to the cut or milled end of the branch pipe section or portion 1 but of a wider contacting surface and heated to 200° C. is pressed against the pipe portion 3 to provide an annular softened welding zone 10, FIG. 5.

Figure 6:
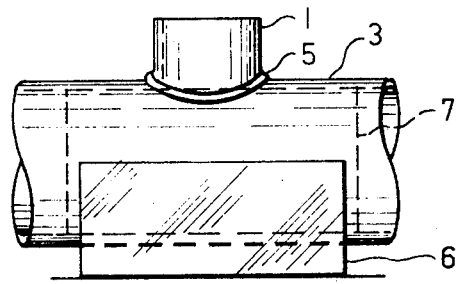
FIG. 6 illustrates the branch pipe section initially pressed against the heated zone of the main pipe section.
Figure 7:
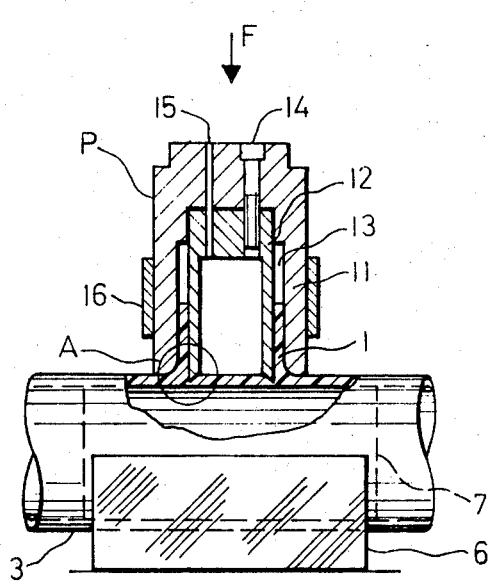
FIG. 7 is a diagrammatic sectional view illustrating the application of pressure at the welding zone utilizing one form of pressing tool according to the invention.

Then the softened and beaded end of pipe portion 1 is pressed against the heated zone of pipe portion 3, to place the respective heated areas in contact to initially join the same so that the press tool can be slipped over the now joined branch pipe portion 1, see FIG. 6. The press tool generally indicated at P in FIG. 7 is such that the welding zone A is completely enclosed and includes an outer aluminum sleeve means 11 and an inner steel sleeve means 12. The annular gap 13 between the sleeve means is dimensioned to tightly encompass the protruding portion of branch pipe 1 but is longer than such portion. The upper portion of press tool P is reduced and constructed so that it can be coupled to a press ram of known type such as by a threaded engagement. The inner steel sleeve means or core 12 is secured to the outer sleeve means 11 by a screw means 14 and a positioning pin 15 so that there can be no relative rotation between these sleeve means. A heating sheath 16 is applied around the periphery of the exterior sleeve means to preheat the press tool if necessary or desirable. This preheat temperature is usually 50° C.

The end or nose sections of the sleeve means 11 and 12 are shaped, to fit the curvature of main pipe section 3 and include a rounded contour 17 on the end of sleeve means 11 having a radius corresponding to one-half the outside diameter of the main pipe and a protruding longer end 18 that is operative to form a cut 19 extending part way through the material of the main pipe portion 3 during the pressing step.

Figure 8:
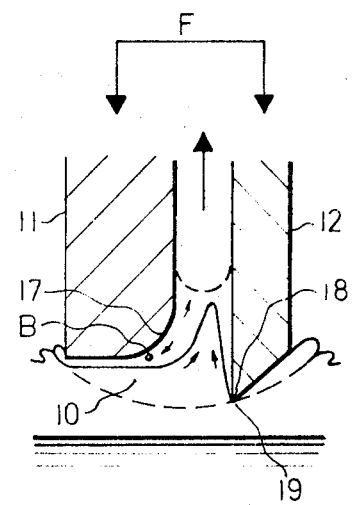
FIG. 8 is a fragmentary vertical sectional view illustrating a detail of FIG. 7 on an enlarged scale.

Thus, with the application of pressure in the direction F of, for example, 50 kg./ per cm.$^2$, a portion of the heated material of the main pipe portion 3 is deformed upwardly in lip shape form into the material of the end of branch pipe portion 1, see FIG. 8, so that the line and area of contact between these portions is substantially increased to increase the rigidity of the weld.

Figure 9:
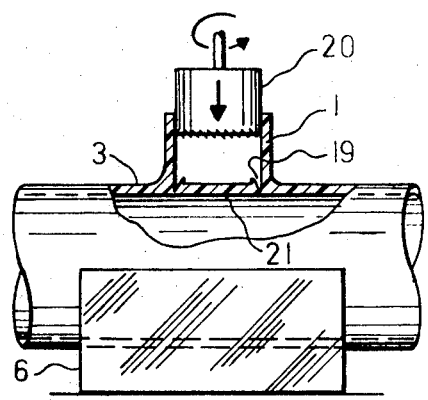
FIG. 9 is a diagrammatic sectional view illustrating the removal of the portion of the main pipe section interiorily of the now welded branch pipe section.
Figure 10:
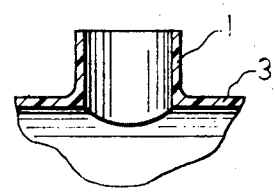
FIG. 10 is a sectional view illustrating a fabricated branched pipe connection.
Figure 11:
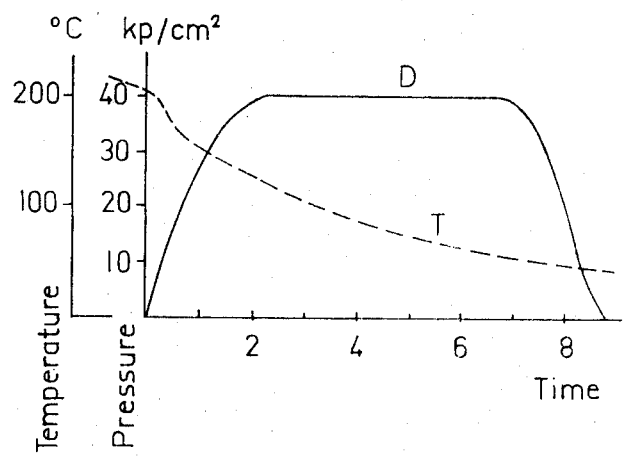
FIG. 11 is a temperature and pressure diagram applicable to an example of the method of this invention.

The pressure is maintained for from 10 to 15 seconds, see FIG. 11, and then the press tool is removed, the support 7 withdrawn and a milling cutter 20 is inserted within welded branch pipe portion 1 to complete the cut 19 and remove the material 21 so that the completed branched pipe connection results, see FIGS. 9 and 10.

Figure 12:
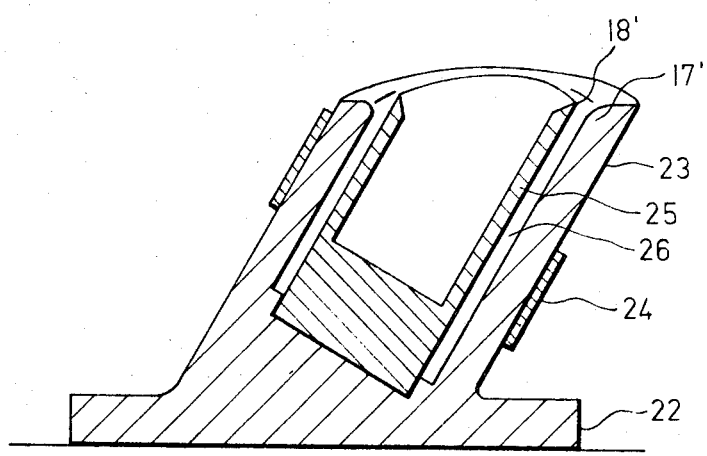

FIG. 12 illustrates a modified press tool arrangement which can be utilized when a branch pipe portion extends at an angle different than 90° from a main pipe portion. Also with this form of tool the main pipe portion and initially joined branch pipe portion are pressed against the tool. Thus this press tool includes a base 22 from which extends the outer aluminum sleeve means 23, surrounded by a heating-sheath 24. The inner steel sleeve means 25 is mounted to the outer sleeve means by screw and pin means, not shown, similarly to the mounting and connecting means shown in FIG. 7. The nose or end portions 17' and 18' are similar to those in the first described press tool. The gap 26 between the sleeve means is dimensioned to accommodate an inserted branch pipe portion and its length is longer than the inserted length of such a branch pipe portion.

Figure 13:
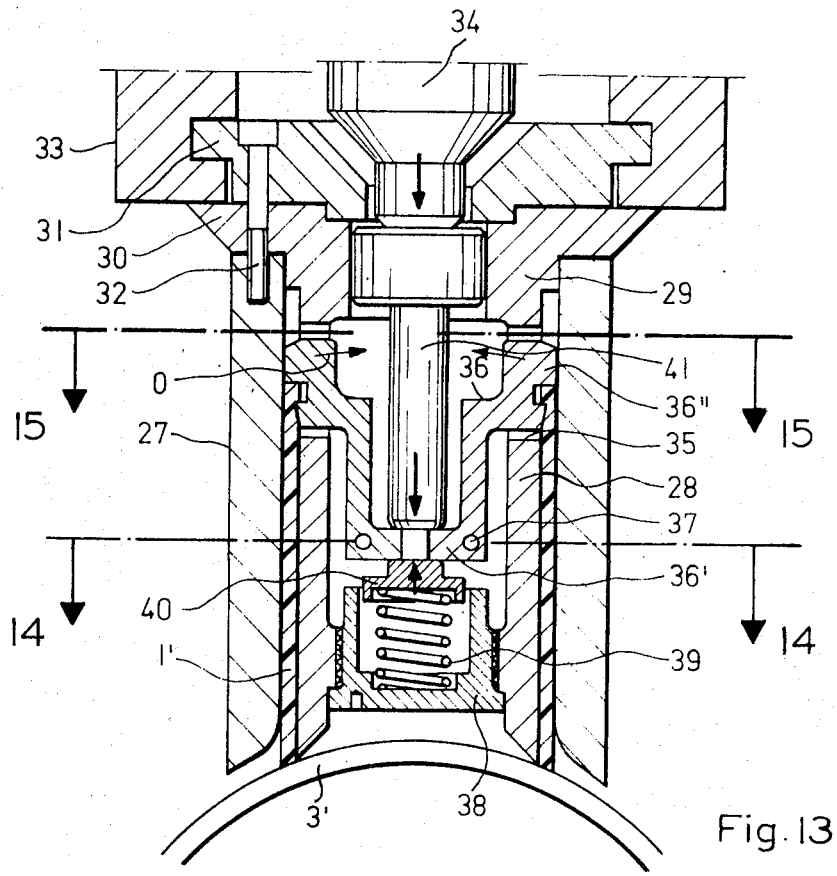
FIG. 13 is a vertical sectional view illustrating another form of press tool arrangement.
Figure 14:
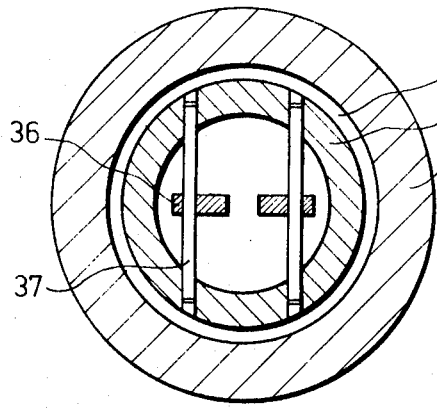
FIGS. 14 and 15 are fragmentary cross sectional views, respectively, taken along lines 14—14 and 15—15 of FIG. 13.
Figure 15:
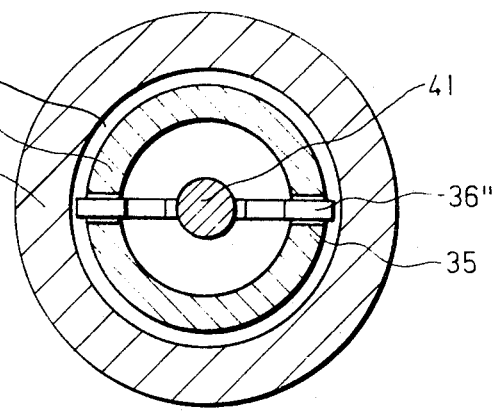

FIGS. 13 to 15 illustrate a further form of press tool in which a branch pipe portion 1' is inserted before it is heated.

This press tool includes an outer aluminum sleeve means 27, an inner steel sleeve means 28 that includes an apertured end portion 29. This apertured end portion is flanged at 30 so that an apertured connecting head 31 and the outer sleeve means can be interconnected with the inner sleeve means by a series of screws, one of which is shown at 32. The connecting head 31 is secured to a press head 33 by a bayonet joint connection. The press head 33 is bored to accommodate a pressing plunger 34. The inner sleeve is provided with latch accommodating cutouts or slots 35 that accommodate swingable latches 36 that are pivoted by transverse pins 37 to the inner sleeve 28, see FIG. 14. The latches 36 include lower offset ends 36' and holding or latching noses 36". A cup-shaped member 38 secured within the inner sleeve 28 supports one end of a spring 39, the other end of which is received within a cup-shaped plunger 40 that is pressed by the spring against the under surface of the lower offset ends 36' of the latches 36 to normally bias the nose or ends 36" outwardly. These latching ends or noses 36' are moved inwardly in response to axial movement of a plunger 41 occasioned by outward movement of plunger 34.

This pressing tool is used in carrying out the method of this invention in the manner illustrated in FIGS. 16 to 20.

With the plunger 34 lowered, the plunger 41 pushes the latches 36 to open position in the direction of the arrows O in FIG. 14. Then a branch pipe portion 1' is inserted in the annular gap between outer and inner sleeves 27 and 28. When the plunger 34 is retracted, the latches 36 are urged outwardly by spring 39 so as to engage the branch pipe portion 1'. Then the so held pipe portion 1' is pressed against a cylindrical heating means 4' having the same shape as the main pipe portion 3'. At 200° C. the end of pipe portion 1' protruding beyond the shaped ends of the outer and inner sleeves is heated to welding condition and spreads laterally as shown at 2' in FIG. 16.

At the same time, a main pipe portion 3', with a backup or supporting aluminum cylinder inserted therein, is provided with an annular heated zone 10' by having a heating means heated to 200° C. and shaped correspondingly to the end surface of the branch pipe portion 1' pressed thereagainst.

Figure 18:
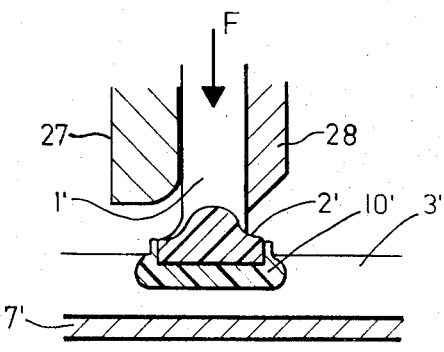

Then the press tool with the inserted and latched branch pipe portion 1 is manipulated to press the heated end 2' against the heated zone 10' of the main pipe portion 3'. As indicated in FIG. 18, the pressure is exerted on pipe portion 1' and a straight line of welding contact at 50 is established.

Figure 19:
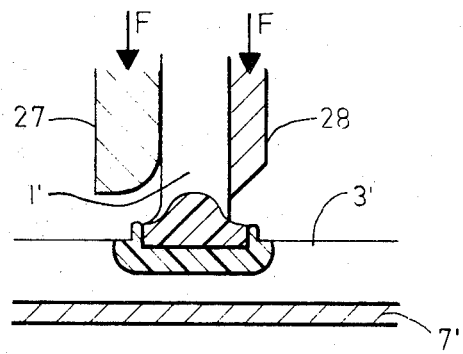
Figure 20:
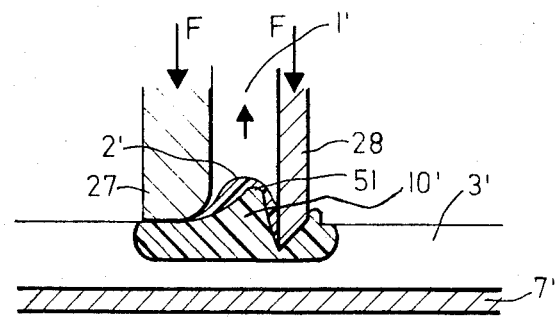

Thereupon the plunger 34 is extended to pivot the latches 36 to release pipe portion 1' and the press head is moved toward the supported main pipe portion 3', so that the outer and inner sleeve means 27, 28 move toward main pipe portion 3', FIG. 19. These sleeve means then subject the material of both pipe portions to pressure of the order of 50 kg./ per cm.$^2$ so that as shown in FIG. 20, material of the heated zone of pipe portion 3' is deformed and pushed upwardly into a lip or hump 51 so that the welding contact is enlarged to increase the rigidity of the weld.

During this pressing step the branch pipe portion 1' is not held by the latches 36 so that the material thereof can flow upwardly. Further the radius of curvature of the nose of outer sleeve 27 is one-half the diameter of the branch pipe portion, while the sharpened end of inner sleeve 28 projects to cut into the material of main pipe portion.

After the press tool is removed from the now welded on branch pipe portion, the connection is completed as described with reference to FIGS. 9 and 10.

Figure 16:
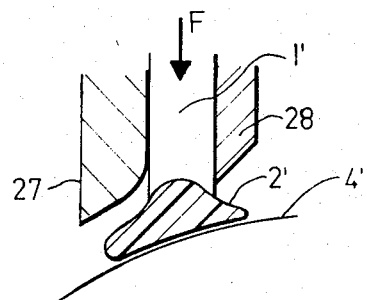
FIGS. 16 to 20 are fragmentary sectional views illustrating the essential method steps of this invention as effected with the use of the press tool illustrated in FIG. 13.
Figure 17:
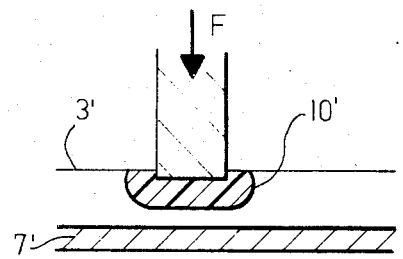

The portions to be welded are initially heated to the melting temperature as shown in FIGS. 16 and 17 and not to some lower temperature because there is no subsequent heating to the melting temperature during the pressing operation.

The cylindrical heater for heating the end of the branch pipe portion can be electrically heated or heated by gas or other fuel. The shaped heater for heating the zone of the main pipe portion that is to be joined by welding to the branch pipe portion can also be electrically heated or heated by a fuel. However, the details of the particular heating arrangement can be varied to suit manufacturing circumstances so long as means are provided to impart sufficient heat to the thermoplastic parts to be welded to raise them to that temperature necessary to effect joining of the parts by welding.

This method can be used for all weldable thermoplastic materials. The welding temperature depends on the thermoplastic materials and the applying pressure as well as the length of time that pressure is exerted depend on the physical properties of the materials, on the size and on the wall thickness of the pipe sections.

For instance, the polyethylene having a molecular weight about 300,000 and a density of 0.955 g./cm.$^3$ has the welding temperature at 200° C. If we take a main pipe section having a diameter of 110 mm. and a wall thickness of 3.5 mm. and a branch pipe section having a diameter of 63 mm. and a wall thickness of 3.0 mm. we have for each step of this procedure the following values for the applying pressure and for the length of time that pressure is exerted.

The amount of pressure exerted when the branch pipe section is heated is decreasing from 0.5 to 0.0 kg./cm.$^2$ and the length of time the section is in contact with the heater is 90 seconds. The amount of pressure exerted when the main pipe section is heated is 29 kg./cm² for 25 seconds and for further 35 seconds 0.0 kg./cm². Simultaneously with the heating of the branch pipe section the main pipe section is heated. The amount of pressure exerted when the press tool is pressed against the main pipe section to deform the welding area of contact is 81 kg./cm² and the length of time that pressure is exerted is between 10 and 15 seconds.

What is claimed is:

1. A method of fabricating welded branched pipe connections from weldable thermoplastic material sections, including the steps of shaping one end of a branch pipe section to conform to the surface configuration of a main pipe section, heating said one end of said branch pipe section and an intersection accommodating zone of said main pipe section that is annular in plan, to at least the welding temperature of the material of said sections, pressing said heated shaped end of said branch pipe section into said zone of said main pipe section while preventing collapse of said main pipe section to initially join said sections at an intersection and while the initially joined sections are still in heated condition, applying pressure on the material of the sections in a direction toward said main pipe section on both sides of said branch pipe section while confining said branch pipe section against spreading transversely of its axis and while still preventing collapse of said main pipe section in an amount sufficient to deform the heated material of the main pipe section toward the branch pipe section to form a hump in the cross sectional line of welding contact between the sections so as to enlarge the effective area of welding contact.

2. A method as claimed in claim 1 in which pressure is exerted on the sections at the welding line of contact from about 10 to 50 kg./cm².

3. A method as claimed in claim 1 and further including removing that portion of the main pipe section interiorily of the welded branch pipe section.

4. A method as claimed in claim 1 in which said heating of said one end of said branch pipe section and said zone of said main pipe section comprises pressing said one end of said branch pipe section against a heated surface shaped in conformity with the shape of said main pipe section and pressing a heated surface shaped in conformity with the shape of said one end of said branch pipe section against said zone of said main pipe section.

5. A method as claimed in claim 4 in which the heating of said one end of said branch pipe section and said zone of said main pipe section are effected substantially simultaneously.

6. A method as claimed in claim 1 in which the heating of said one end of said branch pipe section and said zone of said main pipe section are effected substantially simultaneously.

7. A method as claimed in claim 1 in which said material is polyethylene, said heating is of the order of 200° C. and said final pressure is exerted in the order of 100 kg./cm².

8. A method as claimed in claim 1 in which said final pressing is effected without applying pressure on the other end of said branch pipe section.

9. A press tool for use in fabricating welded branched pipe connections from weldable thermoplastic materials comprising inner and outer sleeve means spaced to accommodate a branch pipe section therebetween, said sleeve means having a length greater than the length of a branch pipe section to be accommodated and terminating in free ends, means connecting said sleeve means together so as to prevent relative turning movement therebetween, the free ends of both said sleeve means being shaped in general conformity with a main pipe section that is to be welded to such a branch pipe section, and the free end of said outer sleeve means having an arcuate, lower, inner surface operative when said sleeve means have a branch pipe section accommodated therein and welded to a main pipe section to exert deforming pressure on said main pipe section.

10. A press tool as claimed in claim 9 and further including movable latch means carried by said inner sleeve means for cooperation with an inserted branch pipe section, means for connecting said interconnected sleeve means to a press means, and said latch means being movable between one position, preventing inward movement of such an inserted branch pipe section and another position, releasing such an inserted branch pipe section.

11. A press tool as claimed in claim 10 and further including spring means urging said latch means to one of said positions and axially movable means operative to overcome said spring means to move said latch means to the other of said positions.

* * * * *

UNITED STATES PATENT OFFICE
CERTIFICATE OF CORRECTION

Patent No. 3,634,167　　　　　　　　　Dated　January 11, 1972

Inventor(s)　Erich Plontke

It is certified that error appears in the above-identified patent and that said Letters Patent are hereby corrected as shown below:

Column 6, claims 9, 10 and 11 are cancelled without prejudice.

Signed and sealed this 22nd day of May 1973.

(SEAL)
Attest:

EDWARD M. FLETCHER, JR.　　　　　　　ROBERT GOTTSCHALK
Attesting Officer　　　　　　　　　　Commissioner of Patents